INVENTORS
THOMAS H. VAUGHN
ARTHUR R. LYTLE
BY
ATTORNEY

INVENTORS
THOMAS H. VAUGHN
ARTHUR R. LYTLE
ATTORNEY

Patented Aug. 13, 1940

2,211,448

UNITED STATES PATENT OFFICE 2,211,448

UTILIZATION OF VOLATILE FLUXES IN WELDING OPERATIONS

Thomas H. Vaughn and Arthur R. Lytle, Niagara Falls, N. Y., assignors to Union Carbide and Carbon Research Laboratories, Inc., a corporation of New York Application August 31, 1937, Serial No. 161,767

16 Claims. (Cl. 113—112)

The invention relates to welding, brazing and soldering processes and apparatus; and more especially it concerns such processes and apparatus involving the use of a gaseous fuel. It has special utility in welding, brazing and soldering operations wherein a fluxing agent is used which is volatile under the conditions of its use.

Among the more important objects of the invention are to provide in a welding or similar operation for continuously introducing a uniform regulated amount of a volatile flux to the welding zone or to welding gases flowing thereto; to provide in novel manner for preventing substantial deposition of solid hydrolysis products within a line conducting a fuel gas and/or an oxygen-containing gas to a welding zone or its equivalent; and to provide for continuously and uniformly conducting to a welding zone a fuel gas mixture containing a selected amount of a readily hydrolyzable volatile flux irrespective of moisture present in the fuel gas.

Welding processes utilizing volatile fluxes such as the alkyl borates already are in use. In such processes, the fuel gas is bubbled through a mixture of ethyl alcohol having an excess of boron oxide ($B_2O_3$). The resultant ethyl borate picked up by the gas imparts a decided fluxing action to the welding flame. Such processes have many disadvantages interfering with their full commercial exploitation to the extent justified by their apparent efficacy. Thus the reaction producing the ethyl borate simultaneously produces the insoluble boric acid which soon forms a thick slurry through which the welding gas cannot pass. To avoid this it is necessary to limit the concentrations of ethyl borate used to relatively small ones. Moreover, as the welding gas is bubbled through the ethyl alcohol-boric oxide mixture, the concentration of ethyl borate in both the mixture and the welding gas rapidly diminishes until eventually the amount of alcohol carried into the flame seriously lowers the flame temperature, while the fluxing action practically ceases.

A process for overcoming the objectionable features of the aforesaid processes and for insuring the continuous addition of a welding gas of a uniform amount of a volatile flux is described in applicants' copending application for U. S. patent, Serial No. 56,042, filed December 24, 1935, entitled "Volatile welding fluxes." The present invention is in certain respects an improvement over the process of the said copending application and facilitates the uniform and continuous feed to a welding zone under a wide range of conditions of a gas containing any selected amount of a volatile flux, which amount may be regulated irrespective of the presence of moisture in the said gas at the source of supply thereof, or of the vapor pressure of the flux under the temperature conditions of its preparation and use.

The volatile or volatilizable flux utilized may be either a pure compound, a mixture of such compounds, or a solution of the same in a volatile liquid such as ethanol. In the latter instance an azeotropic solution of the flux preferably is employed.

In accordance with the invention, a material improvement in welding, brazing and associated operations, both from the standpoint of economy in the use of the flux and in the improved physical characteristics of the welded areas, are effected by close and positive regulation at all times of the ratio of volatile flux to the fuel mixture flowing to the welding zone, independently of the percentage of the active flux in the flux fluid. This control prevents the use of wasteful amounts of volatile flux and solvent, with the resultant reduction in flame temperature.

Broadly considered, the invention involves the introduction into a welding zone, or into one or both of the welding gases flowing to a welding zone, of a volatile flux such as an alkyl borate or alkyl silicate volatilized from a body thereof maintained under selected conditions of pressure and temperature. In certain modifications of the invention the feed control of the flux may be facilitated by the temperature control of the main body of flux or solution thereof, and/or by bypassing a regulated amount of one or both of the welding gases either through or over the surface of the said body of flux, thus regulating the partial pressure of the flux vapors in the fuel mixture flowing to the welding zone.

In the accompanying drawings illustrating various forms of apparatus adapted for carrying out the process features of the invention, Figure 1 is a vertical section through one form of flux chamber and associated parts, parts being broken away;

Figure 1:
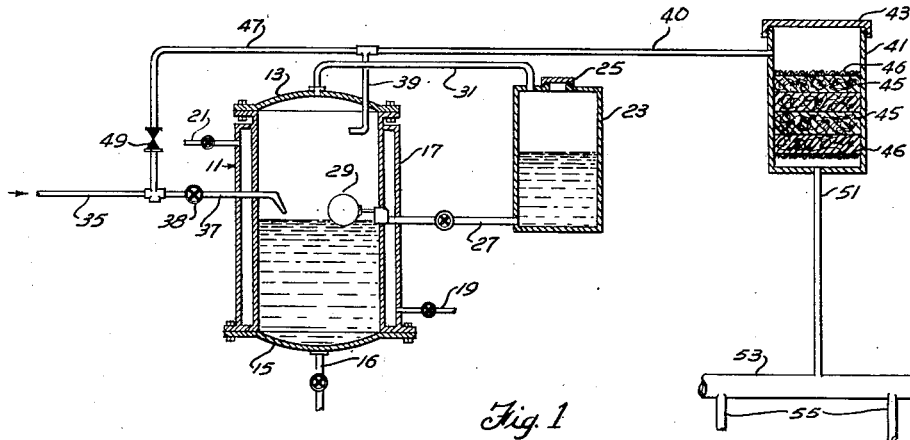

Referring to Figure 1, numeral 11 designates a fluid-tight flux chamber adapted to hold a body of a volatilizable flux such as an alkyl borate or an alkyl silicate, or mixture thereof, as disclosed in our aforesaid copending application, in solution in a dry volatile solvent therefor, such as methanol and ethanol.

The chamber 11 has a removable fluid-tight closure 13, and a removable bottom 15 having a valve-controlled outlet 16; and it is provided with a heat-exchange jacket 17 surrounding the walls, together with valve-controlled inlet 19 and outlet 21 for passing a heat-exchange fluid through the said jacket.

For maintaining a uniform height of liquid flux in chamber 11 when this is desired, there may be provided a flux storage vessel 23 having a closure 25. A liquid conduit 27 having therein a float-controlled valve 29 in vessel 11, connects the vessels 11 and 23, and provides for maintaining a uniform liquid level in the former. A pressure-equalizing line 31 also connects the two vessels.

For supplying a fuel gas such as acetylene to one or more blowpipes, a fuel gas line 35 leads from a suitable source of supply, such as a cylinder of acetylene or liquefied propane under high pressure, or a low-pressure acetylene generator. A branch line 37 controlled by valve 38 connects line 35 with the interior of vessel 11 above the liquid level therein, and has an outlet end directed downwardly towards the surface of the liquid. Vapor outlet lines 39, 40, connect the upper end of container 11 with the inlet end of a fluid-tight filter chamber 41 having a removable closure 43, and a plurality of layers 45 of mineral wool or other filtering medium maintained between retaining screens 46. Fuel gas line 35 also is connected with outlet line 40 by means of a conduit 47 controlled by valve 49.

The outlet from the filter chamber is connected by means of conduit 51 with a fuel gas manifold 53 having spaced branch lines 55, 55, respectively connected with the valve-controlled fuel inlet lines 57 of blowpipes T, each having an oxygen inlet line 59 controlled by a valve 61, and having a mixing chamber controlled by a valve 63. A flashback arrester or trap, such as the trap 139 shown in Fig. 5, may be placed in each line 55. The outlet end of the line 55 extends beneath the surface of a body of a suitable non-aqueous liquid in the trap. Such liquid preferably should be substantially free from organic materials boiling around 400° F. or below, and should be chemically inert to the flux compound. A light mineral oil distillate such as a crank case grade of hydrocarbon lubricating oil of 10-W viscosity functions very satisfactorily.

Figure 2:
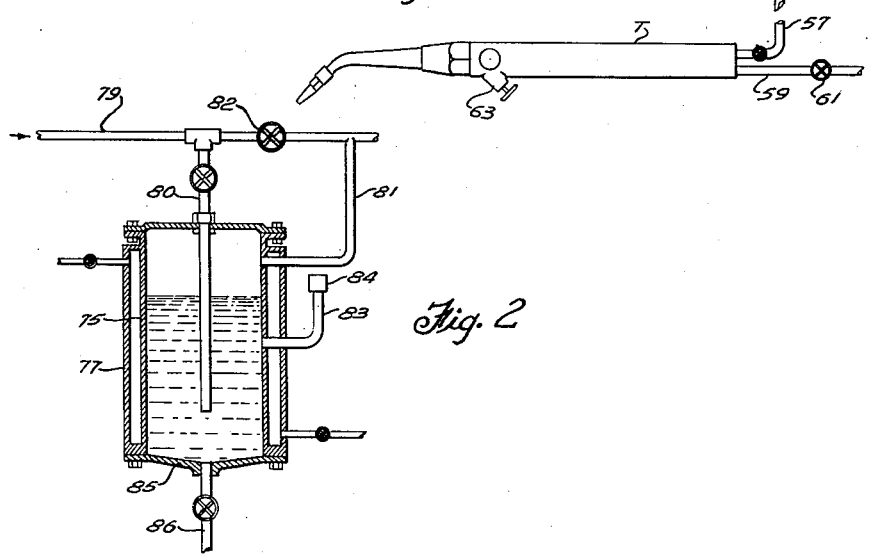
Figure 2 is a vertical section through another form of flux chamber.

Figure 2 illustrates a modified form of flux vessel in which the fuel gas is introduced into the flux below the surface of the liquid. The flux chamber 75 is provided with a heat-exchange jacket 77 and associated parts similar in construction to the chamber 11 of Fig. 1. The fuel gas inlet line 79 is connected with a valve-controlled branch line 80 which extends downwards to a point below the liquid level in chamber 75. A fluid outlet line 81 connects the upper part of chamber 75 with the fuel gas line 79; and a valve 82 is in line 79 between lines 80 and 81. A flux inlet line 83 having a closure 84 is provided as shown. The chamber 75 has a removable bottom closure 85 and a valve-controlled flux drain line 86. A flux storage chamber and associated parts similar to chamber 23 of Fig. 1 may be employed if desired.

In one modification of the process using the apparatus of Figs. 1 and 2, the regulated feed of the volatile flux is accomplished by controlling the rate of vaporization of the flux through temperature control of the liquid flux. In the modification shown in Fig. 2, the various apparatus elements are so designed and regulated that the fuel gas passing through the vessel 75 is completely saturated with the flux mixture before leaving the vessel.

Figure 3:
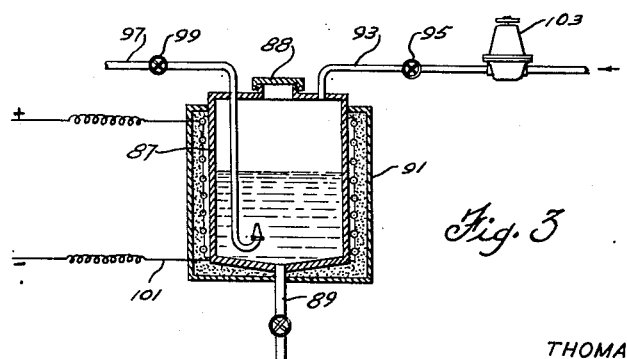
Figure 3 shows in vertical section a modified form of flux chamber.

In the modification of the invention illustrated in Fig. 3, the flux is maintained under a uniform positive pressure, and regulation is secured through a needle valve, the flux being sprayed or vaporized directly into the welding zone or into the fuel gas line leading to the blowpipe or manifold. This modification is especially adapted for use with fuel gas systems that are under high pressures, such as those using high pressure dissolved acetylene. The flux container 87 has a valve-controlled bottom fluid-tight closure 88, a valve-controlled bottom outlet 89 for cleaning out the container, a heat-exchange jacket 91, a fuel gas inlet line 93 controlled by valve 95, and a flux outlet line 97 controlled by a valve 99. The line 97 has its inlet end extending below the liquid level in container 87. The jacket 91 is adapted to be heated by a heating coil 101 arranged in an electrical circuit containing a suitable source of current (not shown). A pressure regulator 103 in line 93 facilitates maintenance of uniform fluid pressure in container 87.

Figure 4:
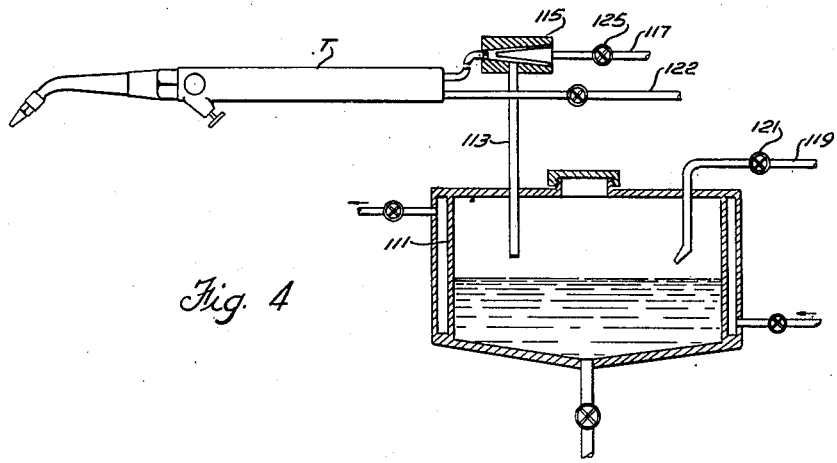
Figure 4 shows a blowpipe and still another type of associated flux chamber, parts being shown in section.

In the form of apparatus illustrated in Fig. 4, the fluid-tight jacketed flux container 111 is constructed in manner somewhat similar to container 11 of Fig. 1. An aspirator 115 in the main fuel gas line 117 is so arranged that the velocity of the main body of gas flowing through fuel gas main line 117 aspirates into the said main body a regulated amount of fuel gas more or less saturated with volatile flux. The fuel gas flows to the flux container 111 through inlet line 113 controlled by valve 121. The outlet line from aspirator 115, and a valve controlled oxygen conduit 122 are respectively connected with a blowpipe T. A valve 125 in the main fuel gas line controls the flow of fuel gas to the aspirator 115.

When using high pressure liquefied fuel gases such as dissolved acetylene, the fuel gas may be saturated with the flux in a cylinder, and this flux saturated mixture under the existent pressure may be admixed with a regulated amount of fuel gas to provide a welding gas having the desired content of flux.

It will be understood that it is possible to utilize a mixture of fluxes instead of but one, by introducing such mixture into the flux chamber, or by the use of multiple or plural bypass equipment generally similar to that illustrated.

When desired, the rate of feed of volatilized flux to a welding gas may be regulated and controlled by controlling the rate of vaporization of the flux. This can be readily done with the apparatus shown in Fig. 3 by disposing the inlet end of line 97 above the liquid level in vessel 87, closing valve 95 and controlling the current passing through the heating coil 101. The flux passes out through line 97 into the fuel supply of the torch.

Figure 5:
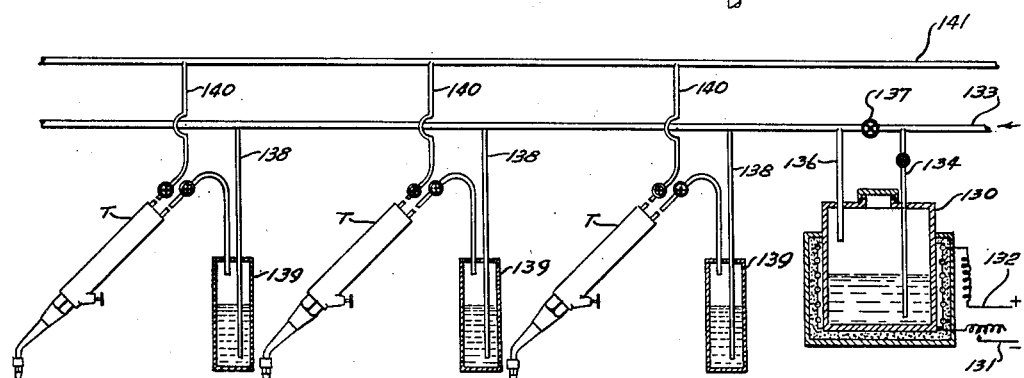
Figure 5 is a somewhat diagrammatic view showing fuel gas and oxygen manifolds, and associated blowpipes and flux chamber, parts being shown in section.

Figure 5 illustrates apparatus adapted for use in incorporating volatilizable fluxes into large volumes of gas, such as are required for the operation of a number of welding or brazing torches on an assembly line. The flux is vaporized into a regulated bypassed portion of the fuel gas. The amount of material vaporized in the flux container 139 may be readily controlled by regulating the amount of heat supplied to the said chamber, as by an electrical heating coil 132 in an electric circuit having therein a rheostat, variable transformer or other current regulating device 131, and a source of electric current (not shown). Otherwise, the container 130 and associated parts are generally similar to container 75 and corresponding parts shown in Fig. 2. In operation, a portion of fuel gas is bypassed from main line 133 through the valve-controlled branch line 134, the liquid in container 130, and outlet line 136 where the bypassed fluid containing flux is mixed with the main body of fuel gas flowing past a control valve 137 and fed to inlet lines 138 of a plurality of blowpipes T. A flash-back arrester or trap 139 preferably is operatively disposed in each of the inlet lines 138. A main oxygen line 141 having branch lines 140, 140, conducts oxygen to the respective blowpipes.

Figure 6:
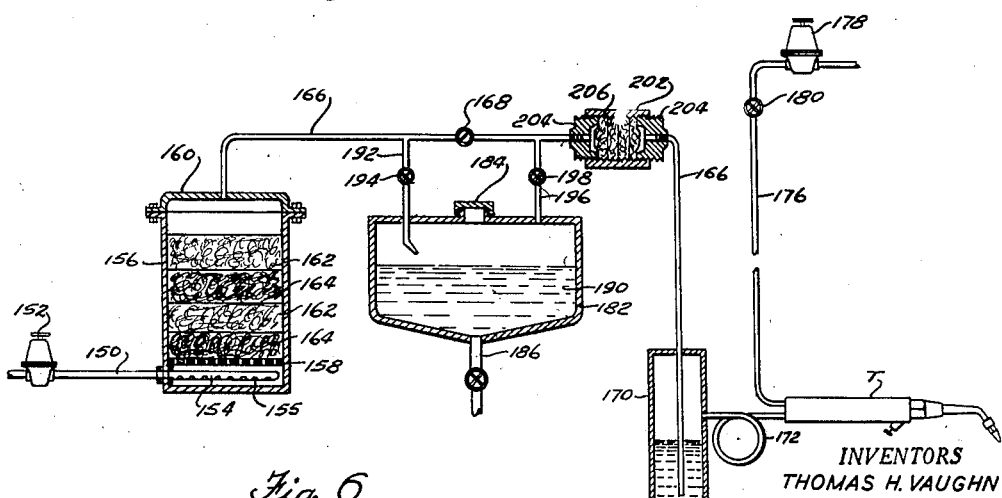
Figure 6 is a somewhat diagrammatic view of a modified apparatus assembly embodying the invention, parts being shown in section, and other parts being broken away.

Figure 6 illustrates one form of apparatus especially adapted for use with fuel gases which contain substantial amounts of moisture. An example of such gas is low-pressure generated acetylene which is saturated with moisture at the existing temperature and pressure. Such a gas is difficult to dry and to further process because of the low allowable pressure drop through the system. The apparatus shown comprises a fuel gas conduit 150 having therein a pressure regulator 152. The outlet end of the conduit 150 is connected with a header 154 having a slotted or perforate portion 155 extending within the lower portion of a drier vessel 156 below a foraminous plate or screen member 158 mounted therein. The vessel 156 has a flanged closure member 160 adapted to be bolted or otherwise secured to the upper flanged margin of the vessel 156 to provide a fluid-tight seal. The vessel 156 preferably is filled with alternate layers 162, 164, respectively of a desiccating agent such as solid calcium chloride, and of a supporting material such as rock wool or glass wool. A conduit 166 having therein a valve 168 establishes communication between the drier 156 and a flash-back arrester or trap 170. A flexible conduit 172, desirably of aluminum or bronze seamless flexible tubing, connects the trap outlet with the fuel gas inlet of the blowpipe T. The latter has an oxygen inlet connected with a suitable source of oxygen under pressure through a conduit 176 having therein a pressure regulator 178 and a cut-off valve 180. A flux vessel 182, having a fluid-tight closure 184 in its top, and having a valve-controlled bottom draw-off line 186 is adapted to hold a body of liquid flux 190. If desired, the vessel 182 may be provided with a heating jacket or the equivalent. A conduit 192 having therein a valve 194 connects the interior of vessel 182 with conduit 166 at a point therein between the drier 156 and valve 168. The outlet end of conduit 192 is directed to discharge fuel gas laterally of and adjacent the surface of the flux in vessel 182 near one side thereof. A fluid outlet conduit 196 having therein a valve 198 connects the upper part of vessel 182 at a point remote from the outlet of conduit 192 with conduit 166 between the valve 168 and the trap 170.

For removing from the impregnated gases any solid components which at times may be present as the result of the hydrolysis of flux caused by any residual moisture present, a pressure-tight filter unit is interposed in the conduit 166 between valve 168 and the trap 170.

The filter unit, in the form illustrated in Fig. 6, is composed of an internally-threaded tubular member 202 having end caps 204, 204, threadedly secured thereto. The respective caps are connected through apertures therein with the conduit 166. A plurality of filter cartridges or pads 206 of hair felt, or other suitable material are closely packed within the unit and are readily replaceable when necessary in obvious manner.

Other means than that shown in Fig. 6 can be used for dehydrating the gases flowing to the flux-introducing chamber; and/or other means than those shown may be employed for removing from the gases flowing to a blowpipe any solid components which would tend to clog the blowpipe passages, or for impregnating with a volatile flux the fuel gas flowing to a heating operation.

In the use of the apparatus shown in Fig. 6, a fuel gas such as low pressure generated acetylene is passed at a selected pressure through the drier 156 where it is dehydrated. The valves 168, 194 and 198 are so adjusted that a selected portion of the fuel gas flows over the surface of the liquid flux 190, and this portion of gas containing flux is returned to the line 166 and then flows through the filter unit and trap 170 to the blowpipe, to the latter of which oxygen containing gas flows through conduit 176. Any solids precipitated in vessel 182 by hydrolysis of volatile flux may be removed through line 186. The filter unit and trap 170 remove any solid hydrolysis products present in conduit 166.

When using volatile fluxes having suitably high vapor pressures, such as methyl borate, the body of flux with which the bypassed portion of the welding gas is contacted may be maintained at atmospheric temperature. However, where fluxes are employed which have vapor pressures that are too low to render them entirely satisfactory for use at atmospheric pressure, such as propyl borate and butyl borate, it is readily possible by heating the body of flux gently to so increase its vapor pressure that a suitable amount of flux is picked up by the bypassed gas, and satisfactory fluxing action is secured. If desired, a refrigerant may be circulated through the heat-exchange jacket of the flux container when using a highly volatile flux such as trimethyl borate, especially when it is found more suitable for any reason to pass the entire body of fuel gas through the flux container, rather than to bypass part of it only, as is necessary when such flux is at room temperature.

In the case of the less volatile fluxes, the amount of flux vaporized by bubbling fuel gas through it depends, for a given bubble size, upon the length of time that the latter is in contact with the flux, up to the point of saturation. To control this time, the fuel gas may be delivered into the body of flux at a greater or lesser depth below the surface of the flux; or the velocity of the gas may be varied. The size of the bubbles may be varied by obvious means to assist in this control of volatilization. Thus, interchangeable tips having orifices of various sizes may be provided in the gas inlet to the flux container. Porous diffusers of selected porosities, such as those made of alundum, sintered glass, or porous artificial filter stone, may be used for producing fine bubble sizes.

When the fluxing liquid is maintained under a definite positive pressure, the liquid may be sprayed in either vapor or liquid form onto the work being welded at the welding zone, or it may be introduced into the fuel gas line and mixed therein with the fuel gas. The rate of volatilization of the flux may be controlled by regulating the temperature of the mixing chamber. Room temperature is suitable when using such volatile fluxes as trimethyl borate, and the azeotropic mixture of triethyl borate and ethanol. If tripropyl or tributyl borate is used, the mixing chamber should be heated externally.

In utilizing the invention in connection with the apparatus of Fig. 1, fuel gas such as propane, dissolved high pressure acetylene or low pressure generated acetylene is fed from supply line 35, the valves 38 and 49 being so adjusted that the gas flowing over the surface of the liquid flux in container 11 will entrain a suitable selected amount of flux. This fluid mixture then flows through line 39 to line 40 where it is mixed with sufficient fuel gas to provide a fuel gas mixture having the desired amount of the flux. This mixture then flows through the filter 41 wherein any dirt, boric acid particles, etc. are removed from the gas, which then flows to the manifold 53 or to a blowpipe. A uniform level of flux can be maintained in container 11 by the means described, but this is not essential as a rule. Where fluxes of relatively low volatility are used, e. g. tripropyl borate or triethyl borate in ethanol or in isopropanol, the container 11 may be heated to facilitate volatilization of the flux, or the apparatus of Fig. 2 may be used, either unheated or heated. The 100% trimethyl borate flux is especially suitable for bronze welding using substantially dry fuel gas such as dissolved high-pressure acetylene. The azeotropic solution of triethyl borate in ethanol is quite effective for welding bronze even when the fuel gas contains considerable moisture, as in the case of low or medium pressure generated acetylene. However, in the latter case considerable boric acid forms in the flux container and must be periodically removed. This can be minimized by partly drying the gas flowing to the flux container.

The following table presents data illustrative of results secured in the practice of the invention:

TABLE I

| Item | Apparatus used | Flux used | Specimen welded | Welding rod | Welding gas |
|---|---|---|---|---|---|
| 1 | A | 100% TMB | 1 | M | X |
| 2 | A | do | 2 | N | X |
| 3 | A | do | 3 | O | Y |
| 4 | B | 35% TEB | 1 | M | Y |
| 5 | B | do | 2 | O | Y |
| 6 | B | do | 3 | O | Y |
| 7 | A | 100% TMB | 4 | O | X |
| 8 | B | do | 4 | O | Y |

| Item | Ultimate tensile strength of welded article | Remarks |
|---|---|---|
| | Pounds per square inch | |
| 1 | 30,000 | Specimen failed in copper. |
| 2 | 31,270 | Specimen failed in plate. |
| 3 | 52,450 | Do. |
| 4 | 30,000 | Failures in copper base metal. |
| 5 | 31,675 | Failed in plate. |
| 6 | 58,000 | Do. |
| 7 | 65,250 | Do. |
| 8 | 64,600 | Do. |

Apparatus

A=Apparatus type illustrated in Fig. 1.
B=Apparatus type illustrated in Fig. 2.

Flux

100% TMB=100% trimethyl borate.
35% TEB=35% solution of triethyl borate in ethanol.

Specimen

1=1"x⅛" electrolytic copper strip.
2=¼" thick deoxidized copper plates, 40° bevel, butt-welded.
3=⅜" thick yellow brass (60—40) plates, 40° bevel, butt-welded.
4=High tensile strength steel plate.

Welding Rod Composition

M=Cu 59 to 62%; Sn 0.5 to 1.0%; balance Zn.
N=Cu 58 to 60%; Fe .65 to 1.10%; Mn 0.03 to 0.15%; Si 0.03 to 0.15%; balance Zn.
O=Cu 56 to 59%; Sn 0.75 to 1.10%; Fe 0.75 to 1.25%; Mn 0.02 to 0.10%; Si 0.02 to 0.10%; balance Zn.

Welding Gas

X=high-pressure dissolved acetylene.
Y=low-pressure generated acetylene.

The amount of flux introduced into the gas mixture may vary in accordance with the character and composition of the welding gas, the nature of the metals to be welded or brazed, and the composition of the welding rod. Amounts of trimethyl borate ranging from 25 to 50 cc. per 100 cubic feet of dissolved acetylene have given excellent results in the brazing of copper and brass, although other amounts of the flux also may be utilized effectively.

When adding more than one type of volatile flux, especially in cases where the vapor pressures of the several fluxes are different, a dual bypass system has been employed in which part of the fuel gas is passed through a chamber containing one volatile flux and another portion of the fuel gas is passed through another chamber containing a second volatile flux. By means of needle valves the relative gas flows through the chambers are controlled, so that the outflowing gases contain desired proportions of the two fluxes. Obviously more than two fluxes can in this manner be introduced concurrently into a fuel gas stream.

It will be obvious from the preceding description that uniform regulation is secured of a volatilizable flux fed to a welding zone, or to a welding gas flowing thereto, irrespective of substantial variations in the rate of flow of the welding gas. The introduction of flux is regulated in accordance with and in response to the rate of flow of the welding gases flowing to the welding zone—or to the volume of such gases—variations in such flow rates producing corresponding variations in the rate of feed of flux to the said zone. The amount of flux thus fed can readily be regulated by adjusting the partial vapor pressure of the volatile flux by thermal or other means, in the presence of a flowing stream of the welding gas, or by selection of a flux having a suitable vapor pressure at atmospheric temperature and pressure.

The term "welding" is utilized in the specification and claims to designate not only high temperature welding operations, but also brazing and soldering operations as well. The present invention is eminently suitable for use in the welding or brazing of nickel, copper, brass, bronze, low carbon steel and high chromium ferrous alloys.

This application is a continuation-in-part of our copending application, Serial No. 56,042, filed December 24, 1935, for improvement in "Volatile welding fluxes."

The invention is susceptible of modification within the scope of the appended claims.

We claim:

1. In a process for welding metals, the steps which comprise supplying welding gases consisting of a fuel gas and a combustion-supporting gas to a blowpipe nozzle to produce a welding flame; introducing into at least one of said welding gases a volatile flux, and regulating the amount of flux thus introduced by adjusting the partial pressure of the volatile flux vapors in the presence of the said welding gases.

2. In a process for welding metals, the steps which comprise introducing at a uniform regulated rate a selected portion of a welding gas flowing to a welding zone into intimate contact with a body of a volatile flux having a constantly uniform surface level, and maintained under conditions whereby a substantial portion of the flux continuously is volatilized and mixed with the said welding gas portion, thereby producing an intimate mixture of the welding gas and flux, and continuously introducing the resultant mixture at a uniform rate into the residual portion of the welding gas flowing to the welding zone.

3. In a process for welding metals, the steps which comprise introducing at a uniform regulated rate at least a portion of a welding gas flowing to a welding zone into intimate contact with a body of a volatile flux having a constantly uniform surface level, and maintained under conditions whereby a substantial portion of the flux continuously is volatilized, while concurrently applying heat to the said body of flux, thereby producing an intimate mixture of the welding gas and flux, and continuously and uniformly introducing the resultant mixture into a stream of welding gas flowing to the welding zone.

4. In a process for welding metals, the steps which comprise introducing at a uniform regulated rate at least a portion of a welding gas flowing to a welding zone into a body of a volatile flux maintained under conditions whereby a substantial portion of the flux continuously is volatilized, thereby producing an intimate mixture of the welding gas and flux, continuously introducing the resultant mixture at a uniform rate into intimate contact with a regulated stream of welding gas flowing to the welding zone, thereby producing a diluted fluid mixture of welding gas and flux, removing solid impurities from the last-named mixture, and feeding the residual fluid mixture to the welding zone.

5. In a process for welding metals, the steps which comprise introducing at a uniform regulated rate at least a portion of a welding gas flowing to a welding zone into contact with a body of a volatile flux maintained under conditions whereby a substantial portion of the flux continuously is volatilized, while maintaining the said body of flux under a substantially constant pressure and elevated temperature during contact of the said welding gas and flux.

6. Process for welding metals which comprises conducting a welding gas into intimate contact with the surface of a liquid body of a volatilizable flux, thereby impregnating the gas with said flux, regulating the partial pressure of the vapors of said body of flux, thereby controlling the extent of impregnation of the welding gas therewith, and introducing the thus-impregnated gas at a regulated rate into a flowing stream of a welding gas flowing to a welding zone.

7. Process for welding metals which comprises conducting a welding gas into intimate contact with the surface of a liquid body of a volatilizable flux, thereby impregnating the gas with said flux, while regulating the temperature of the said body of flux, thereby controlling the extent of impregnation of the welding gas therewith, and introducing the thus-impregnated gas at a regulated rate into a flowing stream of a welding gas flowing to a welding zone.

8. Process for welding metals which comprises directing a stream of welding gas to a welding zone while bypassing a selected portion of the said stream at a uniform rate into intimate contact with a surface film of a volatilizable liquid flux which upon vaporization yields vapors of substantially constant composition, thereby uniformly impregnating said bypassed portion with vapors of the said flux, and thereafter intimately mixing the thus-impregnated portion with the main portion of the welding gas flowing to the welding zone.

9. Process as defined in claim 8 wherein the volatilizable flux is an azeotropic solution of an alkyl borate in a volatile solvent therefor.

10. Process for welding metals which comprises flowing a stream of a moisture-containing welding gas to a welding zone, removing moisture from the said gas, bypassing a selected portion of the resultant gas into intimate contact with at least one volatile flux, thereby impregnating the bypassed portion with said flux, regulating the partial pressure of the vapors of said flux with which the welding gas is contacted, thereby controlling the extent of impregnation of the latter with said flux, mixing the said bypassed flux-impregnated portion of welding gas with the main body thereof, and conducting the resultant mixture to a welding zone.

11. Process as defined in claim 10, wherein the welding gas is an acetylene selected from the group consisting of low-pressure generated acetylene and medium-pressure generated acetylene.

12. Process as defined in claim 10, wherein said volatile flux is an at least approximately azeotropic solution of an alkyl borate in an alkyl alcohol.

13. Process for welding metals which comprises flowing a stream of a moisture-containing welding gas to a welding zone, removing moisture from the said gas, bypassing a selected portion of the substantially dry gas into intimate contact with at least one volatile flux selected from the group consisting of alkyl borates, alkyl silicates, and solutions thereof in alkyl alcohols, thereby impregnating the bypassed portion with said flux, regulating the vapor pressure of the said flux with which the bypassed portion of welding gas is contacted, thereby controlling the extent of impregnation of the latter with said flux, mixing the resultant flux-impregnated portion with the main body of welding gas, and conducting the resultant mixture to a welding zone.

14. Process as defined in claim 13, together with a step of removing from the flux-impregnated bypassed portion of welding gas any solid materials present therein subsequent to mixing said bypassed portion with the main body of welding gas.

15. Process for welding metals utilizing a liquefied welding gas and a volatilizable liquid flux, which comprises saturating the liquefied welding gas with said liquid flux, converting successive portions of the resultant mixture to the vapor phase at a selected rate, and intermixing such portions of the mixed vapors with a welding gas flowing to a welding zone.

16. In a process for welding metals, the steps which comprise supplying welding gases consisting of a fuel gas and a combustion-supporting gas to a blowpipe nozzle to produce a welding flame; introducing into at least one of said welding gases a volatile flux, and regulating the amount of flux thus introduced irrespective of the total volume of welding gases flowing to the welding flame.

THOMAS H. VAUGHN.
ARTHUR R. LYTLE.